(12) United States Patent
Schwarz et al.

(10) Patent No.: US 11,674,413 B2
(45) Date of Patent: Jun. 13, 2023

(54) GAS TURBINE ENGINE WITH GEARBOX HEALTH FEATURES

(71) Applicant: United Technologies Corporation, Farmington, CT (US)

(72) Inventors: Frederick M. Schwarz, Glastonbury, CT (US); William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 707 days.

(21) Appl. No.: 16/131,095

(22) Filed: Sep. 14, 2018

(65) Prior Publication Data
US 2019/0017410 A1   Jan. 17, 2019

Related U.S. Application Data

(62) Division of application No. 14/922,507, filed on Oct. 26, 2015, now Pat. No. 10,107,135.

(51) Int. Cl.
| | |
|---|---|
| *F01D 25/20* | (2006.01) |
| *F01D 21/00* | (2006.01) |
| *F02K 3/06* | (2006.01) |
| *F02C 3/107* | (2006.01) |
| *F01D 15/12* | (2006.01) |

(Continued)

(52) U.S. Cl.
CPC ........... *F01D 21/006* (2013.01); *F01D 15/12* (2013.01); *F01D 25/20* (2013.01); *F02C 3/04* (2013.01); *F02C 3/107* (2013.01); *F02C 7/06* (2013.01); *F02K 3/06* (2013.01); *F05D 2220/36* (2013.01); *F05D 2260/311* (2013.01); *F05D 2260/902* (2013.01); *F05D 2260/98* (2013.01); *F05D 2270/116* (2013.01); *F05D 2270/301* (2013.01); *F05D 2270/3032* (2013.01); *F16D 11/16* (2013.01); *F16D 2011/006* (2013.01)

(58) Field of Classification Search
CPC . F02C 7/06; F01D 25/20; F01D 25/18; F05D 2260/98
See application file for complete search history.

(56) References Cited

U.S. PATENT DOCUMENTS

| 3,133,416 A | 5/1964 | Mock |
| 3,227,176 A | 1/1966 | Luebering et al. |
| (Continued) | | |

FOREIGN PATENT DOCUMENTS

EP   1918564 A2   5/2008

OTHER PUBLICATIONS

European Search Report for European Patent Application No. 16195846.7 completed Mar. 8, 2017.

*Primary Examiner* — Michael R Mansen
*Assistant Examiner* — Mark K Buse
(74) *Attorney, Agent, or Firm* — Carlson, Gaskey & Olds, P.C.

(57) ABSTRACT

A gas turbine engine according to an exemplary aspect of the present disclosure includes, among other things, a fan and a braking system. The braking system is configured to selectively engage the fan during ground windmilling to apply a first level of braking to slow rotation of the fan. Further, when the rotation of the fan sufficiently slows, the braking system is further configured to apply a second level of braking more restrictive than the first level of braking.

7 Claims, 5 Drawing Sheets

(51) Int. Cl.
    *F02C 3/04*     (2006.01)
    *F02C 7/06*     (2006.01)
    *F16D 11/16*     (2006.01)
    *F16D 11/00*     (2006.01)

(56) References Cited

U.S. PATENT DOCUMENTS

| | | | |
|---|---|---|---|
| 4,651,521 | A | 3/1987 | Ossi |
| 5,029,439 | A | 7/1991 | Berneuil et al. |
| 6,312,215 | B1 | 11/2001 | Walker |
| 6,331,078 | B1 * | 12/2001 | Van Duyn ............... F01D 21/04 |
| | | | 384/498 |
| 7,225,607 | B2 | 6/2007 | Trumper et al. |
| 7,621,117 | B2 | 11/2009 | Dooley et al. |
| 7,849,668 | B2 | 12/2010 | Sheridan |
| 8,020,665 | B2 | 9/2011 | Sheridan et al. |
| 2006/0042226 | A1 | 3/2006 | Trumper et al. |
| 2008/0096714 | A1 * | 4/2008 | McCune ................ F01D 25/20 |
| | | | 475/159 |
| 2013/0319798 | A1 * | 12/2013 | Sheridan ............. F01M 11/067 |
| | | | 184/6.11 |
| 2015/0292359 | A1 * | 10/2015 | Ketchum ................ F02C 7/06 |
| | | | 415/1 |
| 2016/0333792 | A1 * | 11/2016 | Viel ....................... F01D 25/18 |
| 2018/0298777 | A1 * | 10/2018 | Nguyen ................... H02P 9/30 |

\* cited by examiner

GAS TURBINE ENGINE WITH GEARBOX HEALTH FEATURES

BACKGROUND

This disclosure relates to health features for gas turbine engines having a geared architecture.

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section.

One type of gas turbine engine includes a geared architecture used to decrease the rotational speed of the fan. In one configuration, the geared architecture includes a plurality of gears contained within a gearbox. The gearbox is supplied with a flow of lubricating fluid, which is typically oil, to protect the gears during operation.

The geared architecture not only must function during aircraft operation. There are also challenges when the gas turbine engine is unlit (i.e., turned off) and the aircraft is stationary on the ground. Rotation of the unlit engine, known as windmilling, occurs as air flows through the unlit engine and causes rotation of a portion of the engine.

To prevent windmilling when an aircraft is on-ground (referred to herein as "ground windmilling"), caps are sometimes provided over the inlet and outlet of the engine. The caps serve to prevent air flow, such as wind, from entering the unlit engine and causing windmilling. Other known methods of preventing windmilling include using a wedging device into the gas turbine engine. Another known method uses a generator associated with the gas turbine engine as a dynamic brake, and attempts to use the resistance of the generator to slow the rotation of the engine.

SUMMARY

A gas turbine engine according to an exemplary aspect of the present disclosure includes, among other things, a fan and a braking system. The braking system is configured to selectively engage the fan during ground windmilling to apply a first level of braking to slow rotation of the fan. Further, when the rotation of the fan sufficiently slows, the braking system is further configured to apply a second level of braking more restrictive than the first level of braking.

In a further non-limiting embodiment of the foregoing engine, the engine includes a gear reduction between the fan and a shaft of the engine.

In a further non-limiting embodiment of the foregoing engine, the braking system includes a brake, and the fan includes a disc. The brake is configured to selectively engage the disc to apply the first level of braking to slow rotation of the fan.

In a further non-limiting embodiment of the foregoing engine, the braking system further includes a pawl, and the disc includes a slot. The pawl is configured to selectively engage the slot to apply the second level of braking and to substantially lock the fan against rotation.

In a further non-limiting embodiment of the foregoing engine, the brake engages the disc following an engine shut-off event and slows the rotation of the fan. Further, when the rotation of the fan sufficiently slows, the pawl engages the slot to lock the fan against further rotation.

In a further non-limiting embodiment of the foregoing engine, the pawl is biased into engagement with the slot, and the pawl is selectively retracted from the slot by an actuator.

In a further non-limiting embodiment of the foregoing engine, the pawl and brake are designed to fail if deployed during an in-flight condition.

Another gas turbine engine according to an exemplary aspect of the present disclosure includes, among other things, a fan and a lubrication system. The lubrication system is configured to pump lubricant into a fan drive gearbox when the fan is windmilling at any rotational speed and direction.

In a further non-limiting embodiment of the foregoing engine, the lubrication system is configured to pump lubricant to the fan drive gearbox when the fan rotates below 1,000 rpm.

In a further non-limiting embodiment of the foregoing engine, the lubrication system includes a main pump and a main reservoir fluidly coupled to the main pump. The main pump is configured to pump lubricant from the main reservoir to the fan drive gearbox during normal operating conditions. Further, the lubrication system includes a secondary pump and a secondary reservoir fluidly coupled to the secondary pump. The secondary pump is configured to pump lubricant from the secondary reservoir to the fan drive gearbox when the main pump does not provide adequate lubricant to the fan drive gearbox.

In a further non-limiting embodiment of the foregoing engine, the secondary pump is one of (1) an accessory pump, (2) a rotary-shaft driven pump, (3) an electrically-driven pump, and (4) an aircraft hydraulic system-powered pump.

A further gas turbine engine according to an exemplary aspect of the present disclosure includes, among other things, a fan, a geared architecture coupled to the fan, at least one sensor configured to generate signals indicative of a condition of the geared architecture, and a control unit electrically coupled to the at least one sensor. The control unit is configured to interpret signals from the at least one sensor to determine a condition of the geared architecture.

In a further non-limiting embodiment of the foregoing engine, the engine includes a lubrication system configured to pump lubricant into a gearbox of the geared architecture when the fan is windmilling. The at least one sensor is configured to generate signals indicative of a condition of the lubrication system.

In a further non-limiting embodiment of the foregoing engine, the at least one sensor is a temperature sensor and is configured to generate signals indicative of the temperature of the lubricant within the lubrication system.

In a further non-limiting embodiment of the foregoing engine, the temperature sensor is adjacent a scavenge line of the lubrication system.

In a further non-limiting embodiment of the foregoing engine, the at least one sensor is a pressure sensor and is configured to generate signals indicative of the pressure of the lubricant within the lubrication system, and the pressure sensor is adjacent a supply line of the lubrication system.

In a further non-limiting embodiment of the foregoing engine, the at least one sensor is a debris sensor configured to generate signals indicative of a level of debris within the lubrication system, and the debris sensor is adjacent a scavenge line of the lubrication system.

In a further non-limiting embodiment of the foregoing engine, the at least one sensor is a vibration sensor configured to generate signals indicative of a level of vibration of the geared architecture, and the vibration sensor is positioned adjacent a bearing near the geared architecture.

Yet another gas turbine engine according to an exemplary aspect of the present disclosure includes, among other things, a fan, a gear reduction between the fan and a shaft of the engine, and a braking system configured to selectively engage the fan to substantially prevent windmilling. The braking system is held in engagement with the fan without requiring electrical power.

In a further non-limiting embodiment of the foregoing engine, the braking system includes a pawl, and the pawl is mechanically biased into engagement with the fan by way of a spring.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
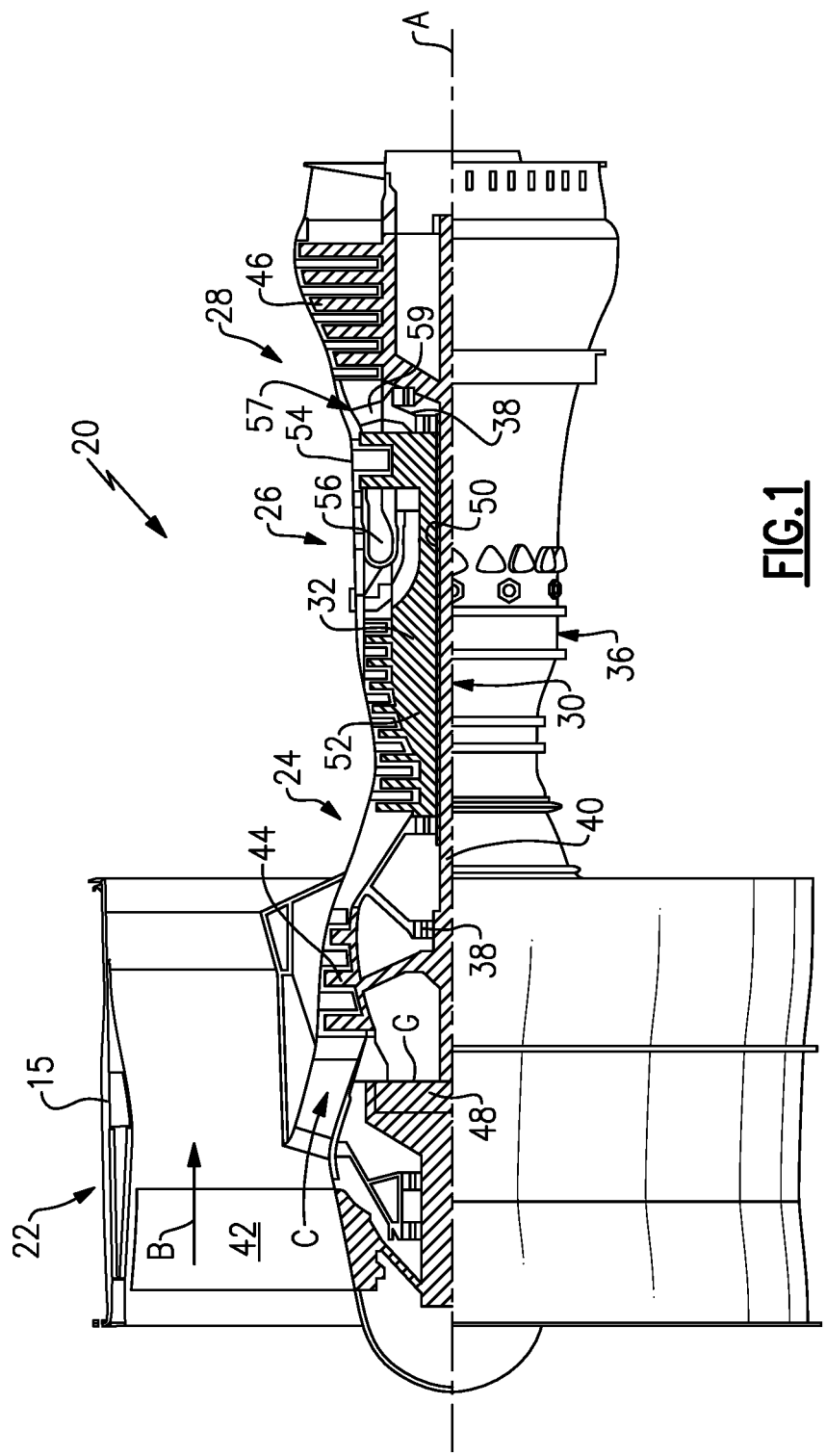
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The geared architecture 48 in this example includes a gearbox G, which is a housing, and encloses one or more gears, such as a sun gear and one or more planetary gears. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/ (518.7°R)]$^{0.5}$. The "Low corrected fan tip speed" as disclosed herein according to one non-limiting embodiment is less than about 1150 feet/second (350.5 meters/second).

Figure 2:
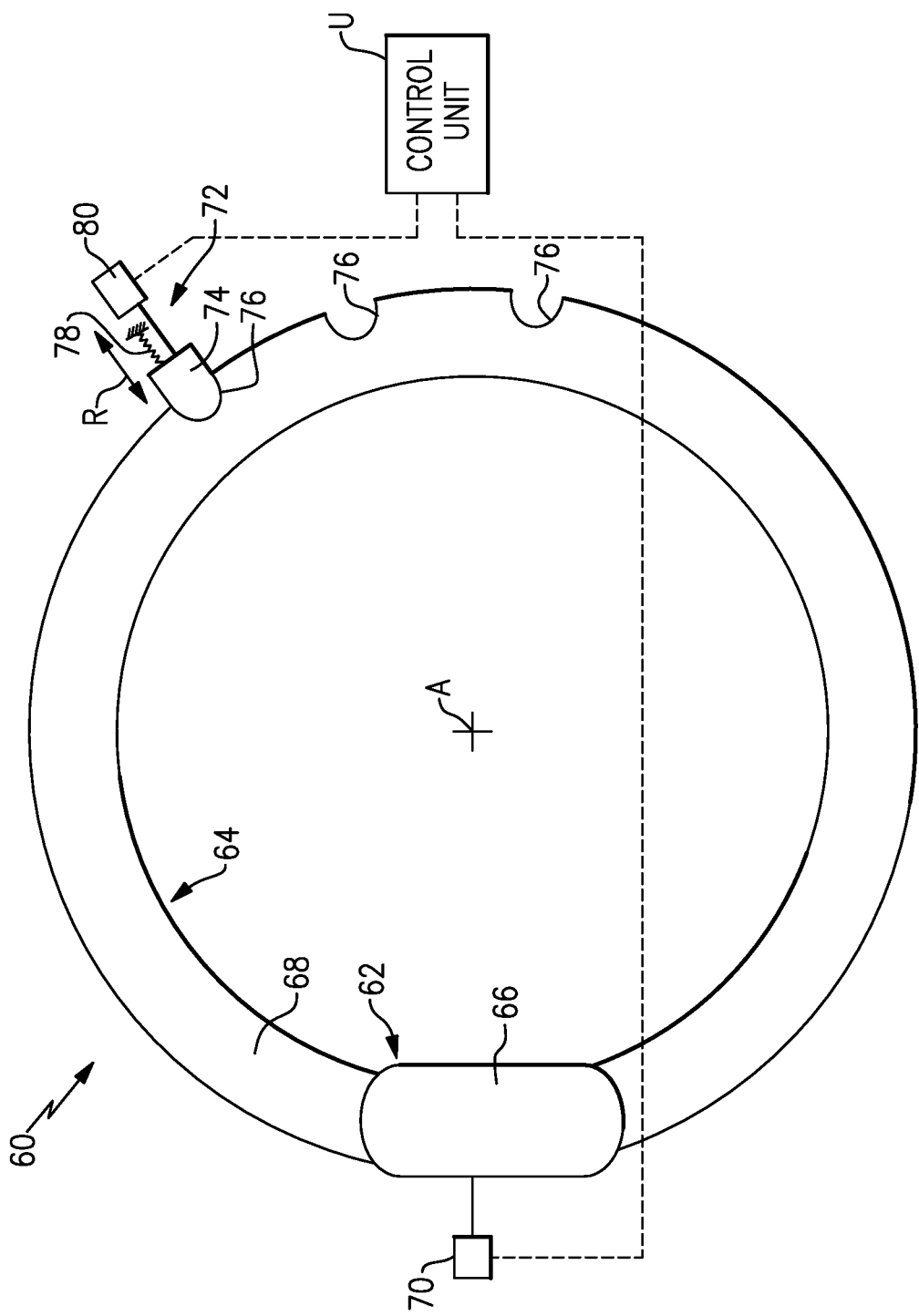
FIG. 2 schematically illustrates a braking system.

FIG. 2 schematically illustrates an example braking system 60 for use with a gas turbine engine, such as the gas turbine engine 20. The braking system 60 is configured to selectively engage the fan 42 during ground windmilling to slow rotation of the fan 42 and, once sufficiently slowed, to lock the fan 42 against rotation. While reference is made to the gas turbine engine 20 of FIG. 1, the braking system 60 could be used with other gas turbine engines.

In this example, the braking system 60 includes a brake 62 configured to selectively engage a disc 64 of the fan 42. The disc 64 may be integrally formed with the hub of the fan 42, or, alternatively, attached to a hub of the fan 42. The brake 62, in one example, is a spring-loaded disc-brake and includes at least one brake pad 66 configured to selectively engage a face 68 of the disc 64. In another example, the brake 62 includes two opposed pads configured to engage respective fore and aft faces of the disc 64.

The brake 62 includes an actuator 70, shown schematically, coupled to the brake pad 66. The actuator 70 is configured to adjust a position of the brake pad 66 to selectively engage the disc 64, per instructions from a control unit U. As will be discussed below, the brake 62 is configured to apply a first level of braking to the disc to slow rotation of the fan 42 during ground windmilling.

The control unit U may be any known type of control unit, including memory, hardware, and software. In some examples, the control unit U may be a stand-alone control unit, and may receive instructions from an electronic engine controller (EEC) or a full authority digital engine controller (FADEC). Alternatively, the control unit U could be provided by the EEC or FADEC themselves.

The braking system 60 further includes a lock 72 including a pawl 74 configured to selectively engage a corresponding slot 76 in the disc 64 to apply a second level of braking to the disc, which is more restrictive than the first level of braking applied by the brake 62. In one example, the second level of braking substantially locks the fan 42 against rotation. In this example, the pawl 74 is positioned radially outward (e.g., in the radial direction R, which is normal to the engine central longitudinal axis A) of the disc 64, and the slot 76 is provided in the radially outer face of the disc 64.

The pawl 74, in one example, is mechanically biased, by way of a spring 78, toward the disc 64 and, when aligned, into engagement with the slot 76. In this example, the pawl 74 is moveable out of engagement with the disc 64 by way of an actuator 80, which receives instructions form the control unit U. Alternatively, the pawl 74 does not need to be mechanically biased, and could be moveable based on the movement of the actuator 80 alone. By mechanically biasing the pawl 74, however, there is an added benefit of not requiring electrical power to maintain the position of the pawl 74 within the slot 76. This feature becomes particularly useful when the aircraft is grounded for extended periods of time, such as weeks or even months. The lock 72 is shown somewhat schematically.

In FIG. 2, only one brake 62 is shown. It should be understood that additional brakes can be provided about the disc 64. Likewise, while only one lock 72 is shown, additional locks can be provided about the disc 64. Further, in FIG. 2, the disc 64 includes only three slots 76. The disc 64 is not limited to three slots 76, and could include any number of slots 76.

Figure 3:
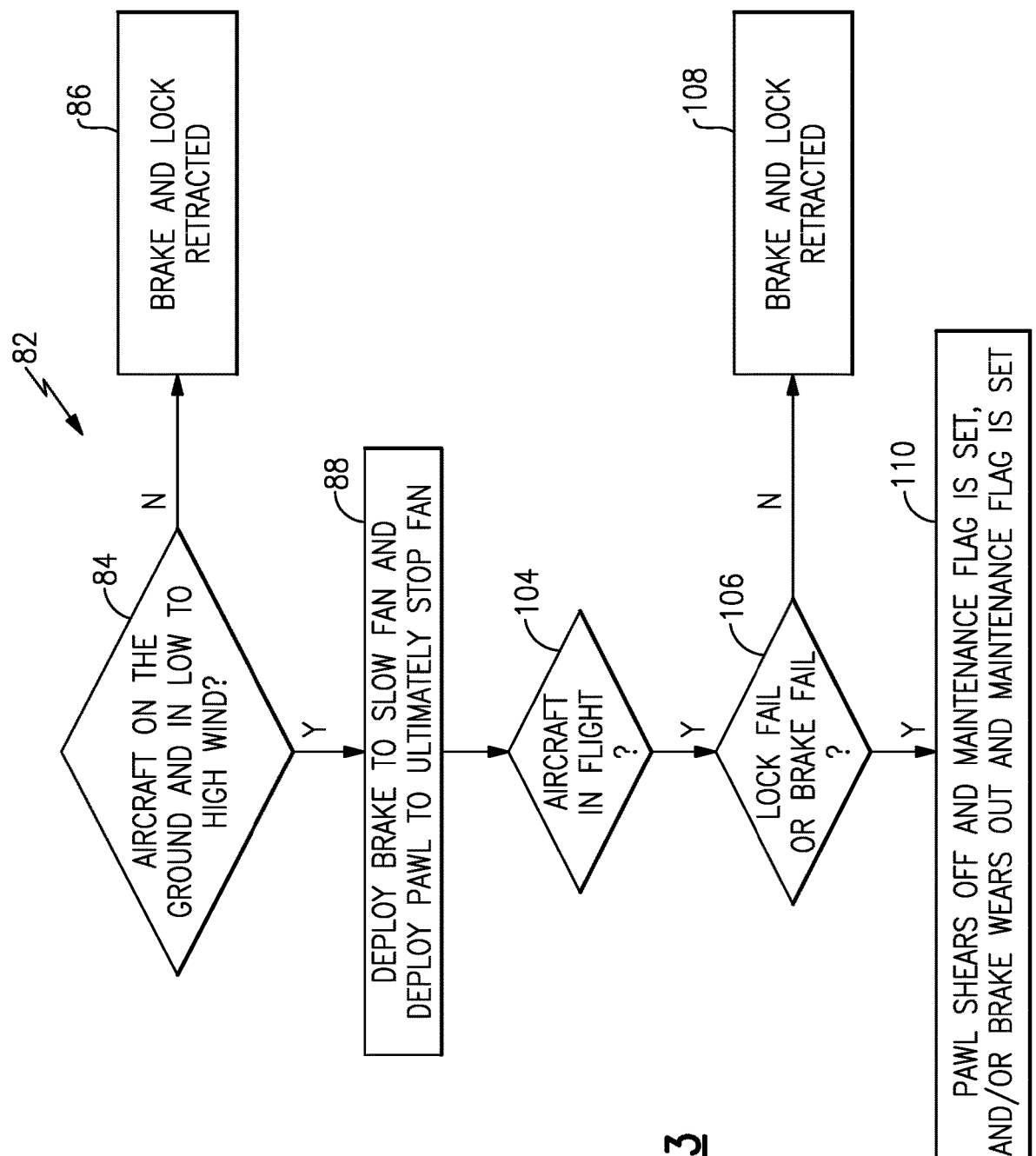
FIG. 3 is a flow chart representing an example method.
Figure 4A:
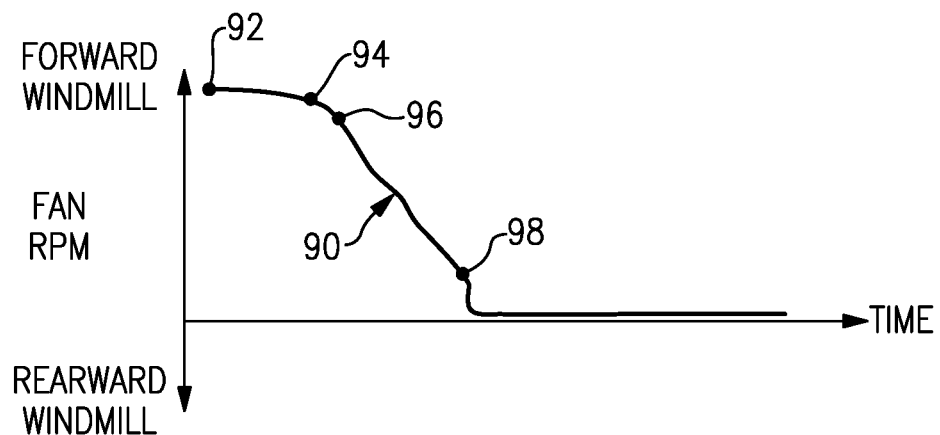
FIG. 4A is a graphical representation of a response of a gas turbine engine using the disclosed braking system.
Figure 4B:
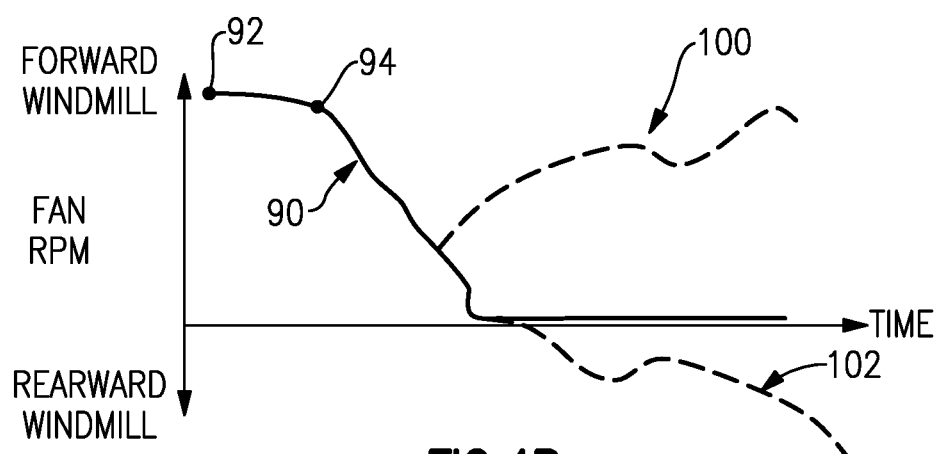
FIG. 4B is a graphical representation of a response of a gas turbine engine without the disclosed braking system.

One example method of using the braking system 60 will now be described relative to FIG. 3 and FIGS. 4A-4B. FIG. 3 is a flow chart that represents an example method 82 of using the braking system 60. FIGS. 4A-4B are graphical representations of fan rpm (rotations per minute) versus time for both an engine including the disclosed braking system 60 (FIG. 4A) and an engine without the disclosed braking system (FIG. 4B).

In the method 82, the control unit U first determines, at 84, whether an aircraft having the braking system 60 is on ground and exposed to low to high winds that may cause windmilling. In another example, the control unit U will lock the rotor as part of each and every engine shutdown. After shutdown, the engine is considered "off" and is electrically dormant. In some examples, the control unit U commands the lock 72 to move into engagement with the fan 42, but the lock 72 remains in place without requiring electrical power. The control unit U may deploy the lock 72 partially in response to a signal from a "squat switch" of an aircraft, which senses the compression of the landing gear. The control unit U may further deploy the lock following a command to shut down the engine.

If the aircraft is not on ground and exposed to a headwind (i.e., the aircraft is in flight and the engine is either providing thrust or is "off"), the control unit U commands the actuators 70, 80 to bring the brake 62 and pawl 74 out of engagement with the disc 64, at 86. On the other hand, if the aircraft is on ground and the engine is commanded to "off," the control unit U, at 88, first commands the actuator 70 to bring the brake pad 66 into engagement with the disc 64. Doing so will slow the rotation of the disc 64. Once the disc 64 substantially slows to a near-stop or a complete stop, the control unit U commands the actuator 80 to deploy the pawl 74 into engagement with the slot 76 to stop any further rotation of the disc 64.

Step 88 may be further appreciated with reference to FIG. 4A. FIG. 4A includes a line 90 representative of rotational speed (in rpm, as determined by the EEC, for example) of the fan 42 relative to time. In the example of FIG. 4A, an aircraft having a gas turbine engine equipped with the braking system 60 reaches ground idle at point 92 after the aircraft has reached a gate following a flight, for example. At point 94, the fuel is cut off to the engine, at which point the fan 42 begins windmilling. At point 96, the control unit U instructs the actuator 70 to cause the brake pad 66 to engage the disc 64 to assist in slowing rotation of the fan 42. At point 98, as the rotational speed of the fan 42 slows to a near-stop or a complete stop, the control unit U instructs the actuator 80 to cause the pawl 74 to engage the slot 76 to lock the disc 64 (and, in turn, the fan 42) against further rotation.

Without the braking system 60, the fan 42 would begin to windmill in either a forward direction, illustrated at line segment 100 in FIG. 4B, or a rearward direction (in the case of a tail wind), illustrated at line segment 102 in FIG. 4B. Prolonged ground windmilling can increase the wear on the gears, ball bearings, bearing races, and all other hardware associated with the geared architecture 48 and more generally the inner shaft 40 (often called the "low spool"). The braking system 60 thus extends the life of all of this hardware and is particularly beneficial in the rare instances where an aircraft is parked for a long period of time, such as weeks or even months.

With reference back to FIG. 3, the method 82 includes a plurality of steps configured to manage the use of the braking system when the aircraft is in-flight. At 104, the control unit U determines whether the aircraft is in-flight. If so, the control unit U next determines, at 106, whether the brake 62 or the lock 72 have failed. A failure could be indicated by an unexpected position indications from a respective actuator 70, 80.

During normal in-flight operation of an aircraft, the brake 62 and lock 72 are retracted, at 108 (i.e., if there is no failure of the brake or lock 62, 72). If a failure of the lock 72 exists such that the lock 72 becomes engaged with the disc 64 during flight, for example, the lock 72 is designed to fail in a manner to allow the rotor to turn. In one example, the pawl 74 is sized and/or made of a material selected to immediately shear away and depart the assembly in a benign manner, at 110, if engaged with the disc 64 during flight. If such a failure condition occurs, a maintenance "flag" is delivered to the maintenance computer of the aircraft for follow up action by maintenance personnel. Alternatively, or additionally, if the brake 62 fails during flight and engages the disc 64, the brake 62 is also design to fail or simply wear away. In one example, the brake pad 66 is sized and/or made of a material selected to be worn down relatively rapidly by the rotation of the disc 64 so as to not encumber operation of the fan 42, and, at 110, another maintenance "flag" is delivered to the pilot.

Figure 5:
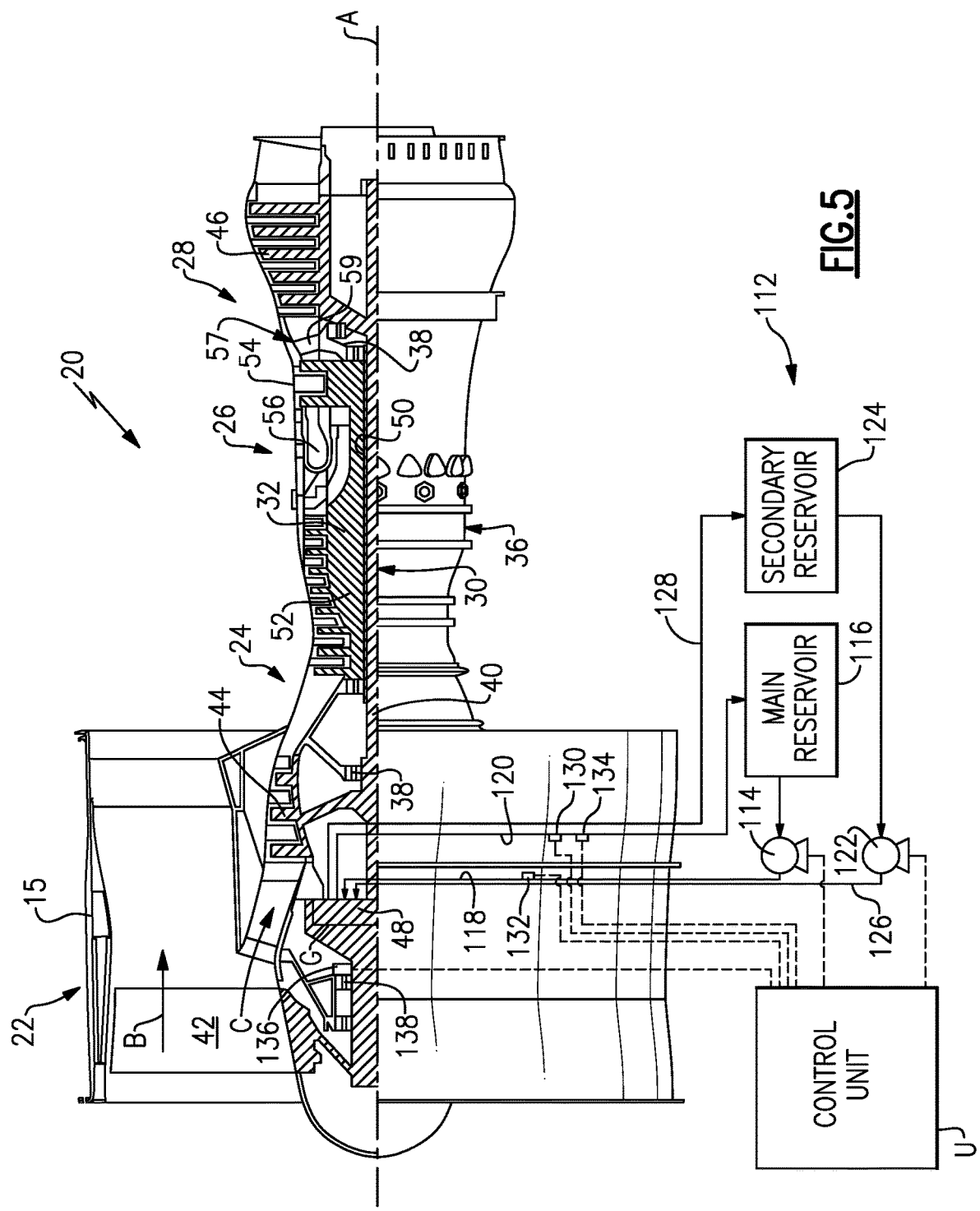
FIG. 5 schematically illustrates a gas turbine engine, and in particular illustrates a lubrication system and a plurality of sensors.

FIG. 5 schematically illustrates the gas turbine engine 20 and a corresponding lubrication system 112. In this example, the lubrication system 112 is configured to pump lubricant, such as oil, into the gearbox G (or, housing) containing one or more gears associated with the geared architecture 48. In particular, the lubrication system 112 is configured to pump lubricant into the gearbox G when the gas turbine engine 20 is windmilling at any rotational speed and any direction. In one particular example, the lubrication system 112 pumps lubricant to the gearbox G when the gas turbine engine 20 is windmilling during engine start before a main supply of oil typically pressurizes.

In this example, the lubrication system 112 includes a main pump 114 and a main reservoir 116 fluidly coupled to the main pump 114. The main pump 114 is configured to pump lubricant from the main reservoir 116 into the gearbox G via a main supply line 118 during normal operating conditions. The term "normal operating conditions," for purposes of this disclosure, includes conditions where the main pump provides an adequate amount of lubricant to the gearbox G. Lubricant is returned from the gearbox G to the main reservoir 116 via a main scavenge (or, return) line 120. The main reservoir 116 may be the main oil tank of the gas turbine engine 20.

The lubrication system 112 further includes a secondary pump 122 configured to pump lubricant to the gearbox G when the main pump 114 does not provide adequate lubricant to the gearbox G. In this example, the secondary pump 122 is fluidly coupled to a secondary reservoir 124, and pumps lubricant to the gearbox G via a secondary supply line 126. Downstream of the gearbox G, lubricant is returned to the secondary reservoir 124 via a secondary scavenge (or, return) line 128. In this example, the secondary supply and scavenge lines 126, 128 are separate from the main supply and scavenge lines 118, 120 in case there is an issue with the main supply and scavenge lines 118, 120. The secondary reservoir 124 may be provided with lubricant from a main oil tank of the gas turbine engine 20, and may further be configured to isolate itself automatically from the main oil tank of the gas turbine engine if a lack of oil is detected.

In this example, the main pump 114 is a pump dedicated to providing lubricant to the gearbox G. The secondary pump 122, on the other hand, may be a pump that has a primary function other than to provide lubricant to the gearbox G. In particular, the secondary pump 122 may be one of (1) an accessory pump, (2) a rotary-shaft driven pump, (3) an electrically-driven pump, and (4) an aircraft hydraulic system-powered pump.

In some examples, the main pump 114 may not be active during windmilling conditions. In those examples, the control unit U is configured to activate the secondary pump 122 to provide a flow of lubricant into the gearbox G to protect the geared architecture 48 from wearing by moving without adequate lubricant.

In still other examples, a gas turbine engine may be programmed to begin providing lubricant to the gearbox G via a main pump only when the fan rotates above a minimum threshold speed, such as 1,000 rpm. If such is the case, the secondary pump 122 will be activated to provide lubricant to the gearbox at speeds below 1,000 rpm, for example.

In FIG. 5, there are a plurality of sensors associated with the lubrication system 112 and the gas turbine engine 20. The sensors are configured to generate signals indicative of a condition of the geared architecture 48. Those signals are interpreted by the control unit U, which is configured to take an appropriate action in response to the received signals.

In FIG. 5, three sensors 130, 132, and 134 detect conditions associated with the lubrication system 112 (e.g., properties of the lubricant) related to the health of the geared architecture 48. A first sensor 130 is a temperature sensor 130, and is configured to generate signals indicative of the temperature of the lubricant within the lubrication system 112. In this example, the temperature sensor 130 is provided adjacent the scavenge line 120. The signals from the temperature sensor 130 are interpreted by the control unit U to determine whether the geared architecture 48 is being adequately cooled by the lubrication system 112. The temperature sensor 130 may be a thermistor or a thermocouple, as examples.

A second sensor 132 is a pressure sensor, and is configured to generate signals indicative of the pressure of the lubricant within the lubrication system 112. The pressure sensor 132, in this example, is adjacent a supply line of the lubrication system 112. The control unit U is configured to interpret the signals from the pressure sensor 132 to determine whether the main pump 112, for example, is adequately pressurizing the lubricant flowing to the gearbox G. The pressure sensor 132 may be provided by a pressure transducer, as one example.

A third sensor 134 is a debris sensor, and is configured to generate signals indicative of a level of debris within the lubrication system. In this example, the debris sensor 134 is provided adjacent the scavenge line 120 to detect for the presence of debris that has been potentially expelled from the gearbox G. For example, the debris sensor 134 may detect the presence of metallic particles (e.g., copper, lead, or silver) within the scavenge line 120, which may suggest that one or more gears within the gearbox G is being worn. In this respect, the debris sensor 134 may be provided by any type of sensor configured to detect the presence of metal within a fluid.

In the example of FIG. 5, the gas turbine engine 20 includes a fourth sensor 136, which is a vibration sensor configured to generate signals indicative of a level of vibration of the geared architecture 48. In this example, the vibration sensor 136 is positioned adjacent a bearing 138 near the geared architecture 48. Increases in vibration at the bearing 138 can suggest that the health of the geared architecture 48 is declining. While the bearing 138 is illustrated generally, the vibration sensor 136 could be positioned adjacent the #1 bearing of the engine 20, however the vibration sensor 136 is not limited to any particular location. The vibration sensor 136 can be provided by an accelerometer, for example.

In FIG. 5, only one of each type of sensor 130, 132, 134, and 136 is illustrated. It should be understood that additional sensors could be included. Further, while the sensors 130, 132, and 134 are shown relative to the main supply line 118 and main scavenge line 120, similar sensors would also be provided relative to the secondary supply line 126 and the secondary scavenge line 128 to detect for the same conditions as described above. When adverse conditions are detected relative to the main supply and scavenge lines 118, 120, the control unit U may activate the secondary pump 122 (if available) or a maintenance "flag" may be delivered to the pilot. Further, while illustrated separately for purposes of discussion herein, the braking system 60, lubrication system 112 and the associated sensors 130, 132, 134, and 136 could be used in combination in a single engine 20.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a fan; and
   a lubrication system configured to pump lubricant into a fan drive gearbox when the fan is windmilling at any rotational speed and direction,
   wherein the lubrication system includes a main pump and a main reservoir fluidly coupled to the main pump,
   wherein, during normal operating conditions, the main pump is configured to pump lubricant from the main reservoir to the fan drive gearbox via a main supply line, and lubricant is able to be returned from the fan drive gearbox to the main reservoir via a main scavenge line,
   wherein the lubrication system further includes a secondary pump and a secondary reservoir fluidly coupled to the secondary pump,
   wherein, when the main pump does not provide adequate lubricant to the fan drive gearbox, the secondary pump is configured to pump lubricant from the secondary reservoir to the fan drive gearbox via a secondary supply line, and lubricant is able to be returned from the fan drive gearbox to the secondary reservoir via a secondary scavenge line,
   wherein the secondary pump has a primary function other than pumping lubricant from the secondary reservoir to the fan drive gearbox,
   wherein the secondary supply and scavenge lines are separate from the main supply and scavenge lines.

2. The gas turbine engine as recited in claim 1, wherein the secondary pump is one of (1) an accessory pump, (2) a rotary-shaft driven pump, (3) an electrically-driven pump, and (4) an aircraft hydraulic system-powered pump.

3. The gas turbine engine as recited in claim 1, wherein the lubrication system is configured such that the main pump only pumps lubricant from the main reservoir to the fan drive gearbox when the fan rotates above a minimum threshold speed, and is further configured such that the secondary pump pumps lubricant from the secondary reservoir to the fan drive gearbox when the fan rotates below the minimum threshold speed.

4. The gas turbine engine as recited in claim 3, wherein the minimum threshold speed is 1,000 rpm.

5. The gas turbine engine as recited in claim 1, wherein the secondary reservoir is provided with lubricant from a main oil tank of the gas turbine engine.

6. The gas turbine engine as recited in claim 1, wherein the lubrication system is configured to automatically isolate the secondary reservoir from the main oil tank of the gas turbine engine if a lack of oil from the main oil tank is detected.

7. The gas turbine engine as recited in claim 1, wherein an entirety of the secondary supply line leading from the secondary pump to the fan drive gearbox is fluidly isolated from an entirety of the main supply line leading from the main pump to the fan drive gearbox.

* * * * *